United States Patent Office 3,008,844
Patented Nov. 14, 1961

3,008,844
IRIDESCENT PIGMENTS, EFFECTS AND PRODUCTS
Louis Grunin, 1 Trinity Ave., Spring Valley, N.Y., and Seymour Richman, Jeffrey Place, Monsey, N.Y.
No Drawing. Filed Sept. 1, 1959, Ser. No. 837,329
6 Claims. (Cl. 106—193)

This invention relates to novel methods of obtaining iridescent pigments, iridescent effects and to products produced thereby.

The imparting of iridescence to various objects such as containers, cosmetic preparations, buttons and other ornamental objects greatly enhance the sales appeal of these items.

This invention provides an improved method of obtaining iridescent effects. The method comprises depositing a thin coating to a surface of an object from a vapor of a high refractive index metal compound and then depositing over the coating another thin coating of a lower refractive index metal compound. This procedure can be repeated several times so as to give the desired thickness and color. A particularly preferred feature of this invention involves removing the combined coatings from the surface of the object such as a flat glass plate so as to obtain an iridescent pigment and then incorporating it in a carrier. This results in the obtaining of a new iridescent product in a composition adapted for imparting iridescence to other objects. Further details follow.

As regards the preferred method the combined coating is removed in various ways so as to obtain it in the form of a flake or pigment type of material. Thus, it can be removed with a wide variety of liquids, such as acetone, ethyl acetate, or even water. The iridescent film comes off the surface as a flake-like material. It is then suspended in a grinding vehicle such as a heavy nitrocellulose lacquer and mixed until the larger flakes have been broken up into smaller particle sizes. If the iridescence is deposited on a commercial film base such as Mylar (polyester film by Du Pont), the Mylar film can then be cut into large iridescent particles (⅛" square) with a sheet cutter (instead of removing the film as a flake).

The combined coating can also be abraded off giving flakes which can be incorporated as such. In the alternatives the coating or pigment after removal is thus incorporated in a carrier, i.e., a vehicle for applying it to other materials or the vehicle in which it is going to be used. Thus, for example, the coating can be incorporated into a solvent as described or paint or directly into plastics prior to processing so that the iridescence is imparted thereto. Examples of carriers as used herein in addition to the liquids mentioned above thus include, polyester resins, acrylic resins, epoxy resins, lacquers, varnishes, enamels, and all other coating materials.

Metal compounds having the desired properties can generally be used. Particularly preferred are metal compounds selected from the group consisting of salts and oxides. In general the term "high refractive index" connotes refractive indices greater than 1.8, "lower refractive index" connotes indices less than 1.8, with a preferred minimum difference of 0.2. Examples of various specific compounds are listed in the table directly below. Cryolite and zinc sulfide are particularly effective in the process of this invention.

TABLE

| Material: | R.I. |
|---|---|
| Magnesium fluoride | 1.32 |
| Cryolite | 1.35 |
| Calcium fluoride | 1.40 |
| Boric acid | 1.45 |
| Barium sulfate | 1.64 |
| Calcium aluminate | 1.65 |
| Magnesium oxide | 1.74 |
| Aluminum oxide | 1.78 |
| Antimony oxide | 1.85 |
| Silicon monoxide | 1.97 |
| Zinc oxide | 2.02 |
| Silver chloride | 2.07 |
| Manganous oxide | 2.16 |
| Lead chloride | 2.20 |
| Zinc sulfide | 2.35 |
| Bismuth oxide | 2.45 |
| Titanium dioxide | 2.70 |
| Antimony trisulphide | 3.01 |

The thin coatings or layers are deposited by thermal vacuum deposition technique as elaborated upon in the examples. The pressures utilized are about 0.01 to 5 microns, each coating is about 500–1500 millimicrons and the number of coatings are about 1 to 10.

The invention and its advantages will be better understood by reference to the following examples.

*Example 1*

A piece of plate glass 1' x 1' is suspended one foot over two molybdenum boats; one boat containing zinc sulfide, the other containing cryolite. A boat is a term common to one versed in the vacuum metalizing art. It generally is in the shape of a canoe supported at either end by an electrode permitting an electrical current to pass through the boat to heat it up and vaporize the material contained in the boat. The glass slab and the molybdenum boat are contained in a suitable chamber to permit the whole system to be evacuated to a vacuum of 0.5 micron of mercury pressure.

An electric current sufficient to heat up the boat and vaporize the zinc sulfide is then applied for a period of time sufficient to give a film coating thickness of zinc sulfide on the glass in the order of ¼ wave length of light (about 700 millimicrons). Then the cryolite boat is heated and a coating film of cryolite deposited over the zinc sulfide, the thickness of this film being about the same as the zinc sulfide. This process is repeated 5 to 10 times to build up a multi-layer film of a few microns in thickness. This film or combined coating has an iridescent appearance before it is broken. The glass plate is removed from the vacuum chamber and treated in the following manner to make the iridescent pigment.

The plate is put into a bath containing an inert liquid for the particular salts that were used to make the iridescent film, in this case water. The surface of the glass is then abraded or scraped to break up the film and put it into suspension in the liquid. The final desired particle size of the pigment can be obtained by mixing the solution under very rapid agitation to break the film particles down to size. The time of mixing and the degree of agitation determines the final size.

*Example 2*

A method similar to Example 1 is used except instead of glass, Mylar film is used as the underlying layer. When the proper film thickness has been obtained the Mylar film is removed from the chamber and run through a wire brush abrading unit that scrapes the flakes of the film and the flake is collected by a vacuum arrangement giving a dry iridescent powder that is incorporated into various carriers for use in the coatings and plastic field.

*Example 3*

The vacuum chamber is prepared as in Example 1 except that glass bottles were suspended over the boats instead of the glass plate, and the coatings of salts applied as in Example 1. Then the bottles are removed and coated with a clear baking lacquer to protect the coatings. The final product is a decorative iridescent bottle.

The technique of this invention is applicable to imparting the iridescent effect directly to the surface of various objects without removing the coatings. Thus, the process is specifically used on synthetic pearl buttons to give a simulated natural iridescence. Synthetic pearl beads can also have a natural appearing iridescence imparted thereto. Glass mirrors can be made by this technique by applying iridescent coatings to a glass plate. The mirror takes on an extremely pleasing antiqued iridescent effect. Materials of this nature are best protected with a coating such as lacquer or enamel paint or any number of other types of coatings known in the art. The coatings can be pigmented or colored to produce extremely interesting effects in conjunction with the iridescent film. This is particularly true in mirror applications. Clear coatings are best utilized with beads or buttons.

The types of articles to which the process of this invention are applicable has been previously adverted to. They cover a large variety of containers, decorative and utilitarian objects, etc.

The advantages of this invention will be apparent to those skilled in the art. An economical, simple process is provided for preparing a wide variety of iridescent objects, yielding decorative effects that cannot be accomplished in any other way at this time.

It is to be undertood that this invention is not limited to the specific examples which have been offered merely as illustrations and that modifications may be made without departing from the spirit of the invention.

What is claimed is:

1. A method of imparting iridescent characteristics to an object which comprises depositing a thin coating to a surface of the object from a vapor of a high refractive index metal compound selected from the group consisting of salts and oxides and then depositing over said coating another thin coating of a lower refractive index metal compound selected from the group consisting of salts and oxides, the depositions taking place at a pressure in the range of about 0.01 to 5 microns of Hg, the thin coatings having a thickness of about 500 to 1500 millimicrons and the high refractive index metal compound having an index greater than 1.8 and the lower refractive index compound having an index of less than 1.8, the minimum difference between the compounds being 0.2.

2. The method of claim 1 in which the deposition of coatings is repeated.

3. The method of claim 1 in which the high refractive index compound is zinc sulfide and the lower refractive index compound is cryolite.

4. A method of obtaining iridescent effects which comprises depositing a thin coating to a surface of an object from a vapor of a high refractive index metal compound selected from the group consisting of salts and oxides and then depositing over said coating another thin coating of a lower refractive index metal compound selected from the group consisting of salts and oxides, the depositions taking place at a pressure in the range of about 0.01 to 5 microns of Hg, the thin coatings having a thickness of about 500 to 1500 millimicrons and the high refractive index metal compound having an index greater than 1.8 and the lower refractive index compound having an index of less than 1.8, the minimum difference between the compounds being 0.2, removing the combined coating from the surface and incorporating it in a carrier selected from the group consisting of liquids and solids.

5. The method of claim 4 in which the carrier is a plastic.

6. A method of preparing iridescent pigments which comprises depositing a thin coating to a surface of an object from a vapor of a high refractive index metal compound selected from the group consisting of salts and oxides and then depositing over said coating another thin coating of a lower refractive index metal compound selected from the group consisting of salts and oxides, the depositions taking place at a pressure in the range of about 0.01 to 5 microns of Hg, the thin coatings having a thickness of about 500 to 1500 millimicrons and the high refractive index metal compound having an index greater than 1.8 and the lower refractive index compound having an index of less than 1.8, the minimum difference between the compounds being 0.2 and removing the combined coating in particulate form from the surface.

References Cited in the file of this patent

UNITED STATES PATENTS

| | | |
|---|---|---|
| 2,712,190 | Sobel | July 5, 1955 |
| 2,865,787 | Risch | Dec. 23, 1958 |
| 2,941,895 | Haslam | June 21, 1960 |